Feb. 8, 1955    H. R. WASSON    2,701,844
METHOD AND APPARATUS FOR ELECTROSTATIC
GENERATION OF ELECTRICITY
Filed Dec. 8, 1950    2 Sheets-Sheet 1
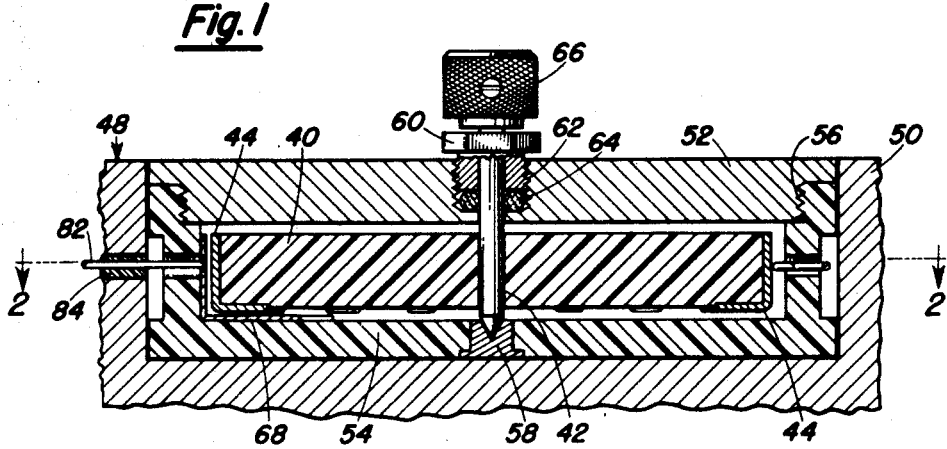
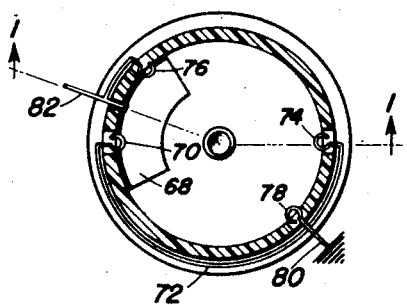
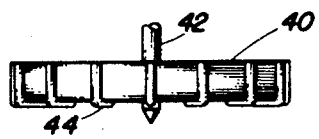
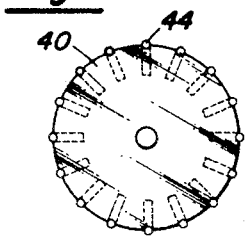
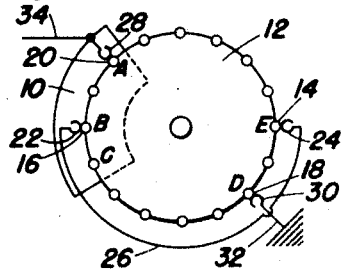
INVENTOR.
Hodge R. Wasson
BY
Paul M. Klein Jr.
Attorneys Feb. 8, 1955

H. R. WASSON 2,701,844

METHOD AND APPARATUS FOR ELECTROSTATIC
GENERATION OF ELECTRICITY

Filed Dec. 8, 1950

INVENTOR.
Hodge R. Wasson

BY

Paul M. Klein Jr.

Attorneys

United States Patent Office 2,701,844
Patented Feb. 8, 1955

2,701,844

METHOD AND APPARATUS FOR ELECTROSTATIC GENERATION OF ELECTRICITY

Hodge R. Wasson, Oakland, Calif.

Application December 8, 1950, Serial No. 199,903

28 Claims. (Cl. 310—6)

(Granted under Title 35, U. S. Code (1952), sec. 266)

This invention relates to methods and apparatus for generating electricity by electrostatic induction.

Prior art electrostatic induction or influence machines usually are unstable in their operation, require an initial charge to be able to operate, and are lacking in any facilities to control accurately the voltage generated.

Accordingly, it is an object of this invention to provide methods and apparatus for generating electricity by electrostatic induction or influence which will operate without the need for an initial charge and by which the generated voltage can be built up rapidly, dependably, and under accurate control.

Certain types of electrostatic generators are known whereof the function is essentially dependent on the presence of two cooperating inductors having what may be termed symmetrical electrical effects on the carriers of the moving members of the generators. Generators of this type and specifically of the class wherein the moving member is a rotor are exemplified by the Toepler-Holtz machine, described in any good elementary physics text, and the Voss machine shown in U. S. Patent No. 410,053. In generators such as the Toepler-Holtz and Voss the symmetry of the electrical effects produced by the inductor means is insured by adhering to a symmetrical arrangement of parts including geometric symmetry in the placement of the inductors relative to those carriers on the rotor intended to be influenced by the inductors and construction of the inductors of the same material. As a result of this symmetrical arrangement such machines are not self-starting but require an initial charge to be placed on one of the inductors in order to start generating.

For purposes of understanding the operation of the present invention this invention can be regarded as a departure from the symmetrical arrangement of such essentially two-inductor machines wherein the alteration of the machine consists, in principle, in converting its symmetry into asymmetry to render it self-starting. In a symmetrical machine, such as the Toepler-Holtz, diametrically opposite carriers find themselves, when the machine is generating, in substantially the same field, i. e. that produced by dimetrically opposite inductors having, respectively, positive and negative charges of substantially the same magnitude. In other words, the electrostatic forces that would be exerted by the inductor means on an uncharged body located at the center of the rotor would be balanced. In an asymmetrical machine, on the contrary, diametrically opposite carriers on the rotor would find themselves in substantially different fields or, in other words, an uncharged body located at the center of the rotor would be subject to unbalanced electrostatic forces from the inductor means.

To convert to asymmetry, the symmetrical arrangement of the assembly comprising the inductor means in association with the carriers on the carrier-bearing moving member is reconstructed so as effectively to destroy at least one of the elements required for effective symmetry. This can be accomplished by physically removing one of the inductors or, equivalently, so displacing it relative to the rotor carriers to be influenced by it or so disabling it or so altering its construction that the electrical effect produced by the reconstructed inductor means is, so to speak, asymmetrical as illustrated, for example, by perhaps the most obvious reconstruction: the complete removal of one inductor so that the net effect on the rotor is the field caused by the presence of only one inductor. The asymmetry of the generators of this invention being thus most simply exemplified by a machine having only one inductor, the class of generators comprehended within this invention may thus be conveniently denominated by this characteristic representing the group. Thus a generator embodying the principle of the present invention possesses effectively the electric field-producing ability exhibited by a machine having only one inductor.

Essentially, then, the invention involves using only a single electrostatic inductor, arranging a conductor having one portion thereof in the region of influence of an electrostatic inductor and another portion remote from that region so that the conductor suffers a charge separation in which charges of one symbol are induced on the first portion and charges of the other symbol are induced on the other portion, severing the conductor so that the two portions are separated from each other and thereafter adding charge from one of the portions of the conductor to the inductor to alter the charge on the inductor. This process is repeated with a plurality of conductors, preferably cyclically, when the invention is used as a practical thing for the generation of appreciable voltages.

For a more complete description of the invention recourse is had to the accompanying drawings illustrating certain specific embodiments of the apparatus of this invention. In these drawings:

Fig. 1 shows a cross section along the line 1—1 of Fig. 2 of an electrostatic generator using a rotor and stator combination;

Fig. 2 is a cross section of the device of Fig. 1 taken along the line 2—2 in Fig. 1, but with the rotor removed;

Fig. 3 is a plan view of the rotor of the device of Fig. 1;

Fig. 4 is an elevational view of the rotor of Fig. 1;

Fig. 5 is a schematic diagram for showing the principles of operation of the device of Fig. 1;

Figure 6:
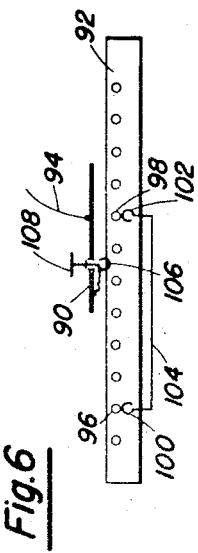
Fig. 6 is a schematic diagram for showing the principles of operation of reciprocating generators made according to this invention.

Reference is now made to Fig. 5 which shows schematically one class of apparatus of this invention suitable for carrying out the method of this invention. The numeral 10 designates an electrostatic inductor which can be made in almost any convenient shape and size and is preferably of a conducting material. The use of the single inductor destroys the geometric element of symmetry found in such machines as the Toepler-Holtz with its two diametrically opposed inductors. Numeral 12 designates a rotor provided with a plurality of carriers certain of which are numbered 14, 16, 18, and 20. The rotor can be made of any suitable insulating material preferably one of excellent insulating properties such as plastics of the methyl methacrylate type. The carriers are, as is usual in influence machines, conductors isolated from each other and fastened to the rotor in any suitable way such as by embedding them or cementing them. The carriers can be made of any suitable conducting material and it is believed that, in general, the device will be operable if it is made in the usual manner of manufacture of influence machines and if the carriers are made of what would generally be considered to be the same material as the inductor. However, to insure that the charge generated on the inductor will always be of the same sign or symbol it is preferable to choose a material for the carriers having a different electronic work function from that of the material used for the inductor, the symbol of charge on the inductor being determined by whether the work function of its material is higher or lower than that of the carriers. This introduces an element of asymmetry in the electrical interaction of the inductor means with the carriers. The rotor is arranged to bring the carriers sequentially into and out of the effective region of electrostatic influence of the inductor. Means are provided to place into electrical conducting relation a carrier in the region of influence of the inductor with a carrier outside of that region. These means are preferably brushes, such as shown schematically at 22 and 24, sequentially contacting carriers 16 and 14, respectively, and interconnected as by a wire 26. Means is also provided for placing the inductor 10 in electrical conducting relation with the carriers as they pass through a certain phase of their cycle. This means is also illustrated as preferably being a brush 28, electrically connected to the inductor 10 and arranged for sequentially contacting carriers as they reach position A. Means are also preferably provided for effectively grounding the carriers during a certain phase of their cycle. These means are constituted in Fig. 5 by a brush 30 shown schematically as connected at 32 to a ground and arranged to contact sequentially carriers such as 18 passing point D.

Operation

The operation of the device will be apparent from the following. Carrier 16, brush 22, wire 26, brush 24 and carrier 14 constitute a conductor of which one portion, 16, is close to and therefore in the region of effective electrostatic influence of the inductor 10 and of which the other portion, 14, is remote from that region. This arrangement will, in general, result in the existence of a potential difference between inductor 10 and carrier 16 and this potential difference can be predetermined by the choice, hereinbefore described, of materials of different work functions for the inductor and the carriers. This potential difference exists without any assumption of an accidental residual charge on inductor 10 and the device will operate even when it starts out with inductor 10 initially uncharged. The difference of potential causes a charge separation on the aforedescribed composite conductor, inducing say a positive charge on carrier 16 and a negative charge on carrier 14. If the rotor 12 now moves in a counterclockwise direction the conducting relation between carrier 16 and carrier 14 is broken. By this severing of the composite conductor the carrier 16 is left with a net positive charge and the carrier 14 with a net negative charge. Continued rotor rotation in the counterclockwise direction brings the carrier 14 to position A where it is placed in electrical conducting relation with the inductor 10 by means of brush 28. Although the brush 28 is shown as contacting the carrier at A while the carrier is in the immediate region of influence of the inductor 10 this arrangement is not necessary, it being sufficient that the brush 28 contact the carrier during the time the carrier passes from contact with brush 24 toward brush 22. The carrier 14 thereupon shares its net negative charge with the inductor 10 and if the inductor is designed, as is preferable, to have a considerably greater capacity than the carrier, the carrier loses practically all of its charge to the inductor thus giving the inductor 10 a net negative charge. During this time the carrier 16, with its net positive charge, has come into contact with the brush 30. The brush 30 is connected effectively to a ground. That is, it is connected to an external body, either the earth or another body, of very large capacity relative to the capacity of the parts of the device. Continued rotation of the rotor 12 in the counterclockwise direction causes this sequence of events to be repeated with each pair of carriers that simultaneously reach positions B and E, respectively. However, as each carrier reaches position A it contributes charge to the inductor 10 and thus the charge on the inductor 10 is built up quite rapidly so that the induction effect during each succeeding sequence is more pronounced. That is, for example, after a counterclockwise rotation of the rotor through 360° from the initial position shown in Fig. 5, the inductor 10 has acquired a considerable negative charge as contrasted with its original state of zero net charge and therefore the charge separation which it is now capable of producing in the conductor 16—22—26—24—14 is considerably increased and hence the net charge on carrier 14 after rotation beyond the 360° will be much greater than on its first turn around. The carrier 14 will thus be able to contribute much more negative charge on this second trip to the brush 28 than it would on its first trip. To make use of the potential generated by the device, as for example to charge an electroscope, a lead 34 is provided connected to the inductor 10. Were it desired to obtain charge of sign opposite to that provided by lead 34 it is merely necessary to place a collecting brush to contact carriers as they pass through a region effectively remote from the influence of inductor 10 on the path between points B and D. In the event that charge is collected in this manner by such a collecting brush and the body which collects the charge is of such large capacity relative to the carriers as to extract substantially all the charge from the carriers then the device will operate efficiently without the additional use of a ground brush.

If the direction of rotation of the rotor 12 is reversed then the charge is removed, step by step, from the inductor 10 and the potential available at the lead 34 is thereby gradually reduced. Since the apparatus is reversible it will be apparent that the potential generated can be controlled at all times from zero up to any desired value.

Reference is now made to Figs. 1 through 4 showing a specific preferred physical embodiment based on the principles of operation explained in connection with the schematic showing in Fig. 5. The device shown in Figs. 1 through 4 is especially useful in charging pocket dosimeters and has been found to work quite satisfactory when made in a size small enough to be held conveniently in the hand. The embodiment comprises a rotor 40, preferably of methyl methacrylate plastic mounted on a shaft 42 to which it is conveniently fixed as, for example, by a force fit. The rotor is provided with a plurality of carriers 44 attached to it by cementing or embedding or the like. The rotor is mounted to turn within a case designated generally by the numeral 48. The case comprises a generally cylindrical conducting housing 50, preferably of metal, open at one end for assembly and adapted to be closed by a conducting disc 52 to constitute a conducting shield substantially completely surrounding the charged parts of the generator. Tightly fitting within the outer housing is an inner housing 54 of insulating material, such as Lucite. The disc 52 forms a substantially closed chamber with the housing 54 by threading into it at 56. The rotor is arranged to rotate in this chamber, its shaft turning in bearing 58 tightly fitting in housing 54 and in the bearing surface in a bushing or gland 60 threaded at 62 into the disc 52 and sealing the chamber with an O-ring or the like 64. The rotor is arranged to be turned by a knurled knob or the like 66. An inductor 68 of any suitable conducting material is affixed to the interior of the housing 54 in a position to influence the carriers as they pass near it. The inductor can be made of metal or other conductor and in a preferred embodiment has been made of carbon applied to the housing by coating it with a colloidal suspension of graphite. A brush 70 conveniently formed merely by shaping a hook on one end of a sufficiently springy wire 72 contacts a carrier 44 under the influence of inductor 68 while a similar brush 74 contacts a carrier lying effectively out of the region of influence of the inductor. Brush 76 series to electrically connect carriers to the inductor 68 while brush 78, shown schematically in Fig. 2 as grounded at 80, is connected to the outer metal casing 50. Carriers contacting brush 78 are, in effect, grounded since the metal casing 50 is adapted to be held in the hand of an operator. A lead 82 serves as a take-off for the potential of the device and can be designed, for example, to connect with any particular type of electroscope dosimeter. Preferably the sensitive elements are hermetically sealed in the casing by passing lead 82 through an insulating seal 84.

Operation

The operation of the physical embodiment of the invention illustrated in Figs. 1 through 4 is similar to that described in connection with the schematic diagram of Fig. 5. The method of the invention is carried out by rotating the rotor 40 by means of the knurled knob 66. This in effect performs, with a plurality of conductors, the sequence of bringing one portion of a conductor into the region of electrostatic influence of the inductor 68 while maintaining another portion thereof in a region remote from the influence of the inductor, severing the two portions from electrical conducting relation with each other so as to produce net charges of opposite symbol on each of the two portions and subsequently electrically connecting to the inductor one of these portions carrying a net charge. The conductors are in each instance constituted by the pairs of carriers 44 that simultaneously contact brushes 70 and 74. Rotation of the rotor in a counterclockwise direction in Fig. 2 brings carriers from a position of contact with brush 74 into contact with brush 76 where they give up a large portion of their charge to the inductor 68 which in turn can be used to charge a body electrically connected to the lead 82. Rotation of the rotor in a clockwise direction brings carriers from a position in contact with brush 70 into contact with brush 76 and as they continue in their path in a clockwise direction they remove a small amount of charge from inductor 68 thus reducing its potential toward zero. If the device is used for a charging pocket dosimeter of the type known as a Lauritsen electroscope the casing 50 can be constructed to provide a socket in which the electroscope can be plugged with its outer shell grounded to the casing 50 and its charging contact touching lead 82. The generator with the dosimeter plugged in can then be held in the hand of an operator with his eye to the electroscope and by slowly rotating the knurled knob 66 the operator can, under full control, gradually charge up the electroscope to any desired value. If this value is exceeded he can reduce it by simply turning the knob 66 in the opposite direction. The case being held in the operator's hand, and the shell of the electroscope being in touch with the case, a definite ground connection is established and the charging of the electroscope is accomplished in a stable manner with no difficulties such as might be expected if the sensitive parts of the system were floating at some undetermined potential above ground.

Although the specific embodiment of the invention hereinbefore described is a preferred form of the apparatus of the invention it will be apparent that the construction of the apparatus can be varied widely within the principles of the invention and the method of the invention can be carried out with different apparatus. The embodiment of Fig. 1 visualizes the rotation of the rotor while the casing or stator is held fixed but obviously the rotor can be held fixed and the casing rotated about it or both can be rotated simultaneously at different speeds since relative motion between the two parts is all that is required. Also this relative motion need not be purely rotational but can be translational or any suitable combination of translation and rotation. Although the schematic diagram of Fig. 5 shows the use of pairs of carriers connected by only one wire 26 to form sequentially a plurality of conductors each of which is in turn subjected to induction by the inductor 10 and severing, as contemplated by the method of the invention, nevertheless the same result can be accomplished by connecting, for example, each diametrically opposite pair of carriers with its own conducting wire extending across the rotor and with some means, such, for example, as a cam operated switch interposed intermediate the ends of the wire, for sequentially opening and closing the circuit between each pair of carriers as the carriers reach the appropriate positions.

Figure 7:
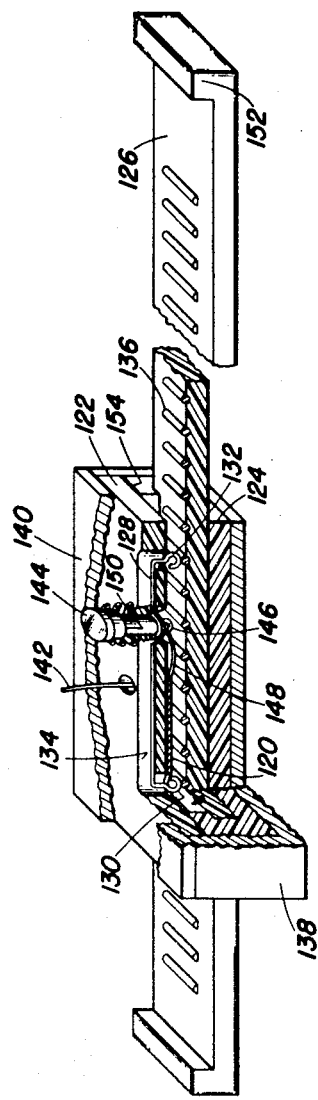
Fig. 7 is a preferred embodiment of a reciprocating generator of this invention.

Other preferred examples of the apparatus of the invention are shown schematically in Fig. 6 and in a physical embodiment in Fig. 7. These examples use relative motion of translation to carry out the method of the invention. They preferably employ the expedient of a displaceable brush to carry out the function for insuring that during voltage generating procedure, for example, after a carrier has once been used through a cycle, it is returned to its starting position for the next cycle via a path or sequence of events such that it does not reduce the charge built up on the inductor during the first cycle. In contrast, this function is accomplished in the device of Fig. 5 merely by the rotation of the rotor. That is, for example, carrier 16 can be said to have completed its part in one cycle of building up charge on inductor 10 when it has been at position B and moved in a direction toward C sufficiently to have broken its connection with carrier 14. The carrier 14 would, of course, be required to share its charge with inductor 10 before the cycle would be regarded as completed. It is apparent, then, that before carrier 16 is permitted to repeat this cycle it is compelled to return along a different path to position B. That is, it is not permitted to return along a path in a direction CB but is required to go in the direction along the path BCDEAB coming into contact, as it so moves, with grounding brush 30. The result of this constraint to travel along a different path is that the carrier is prevented from discharging the inductor 10.

Reference is now made to the schematic showing in Fig. 6 wherein members 90 and 92 are arranged for relative translation in the direction of their longer dimensions. The member 90 constitutes the inductor, being provided with a takeoff lead 94, while the member 92 is provided with a series of carriers such as 96 and 98. Brushes 100 and 102 electrically connected by element 104 are provided to conductively connect a carrier in the region of influence of the inductor 90 with a carrier remote from that region. A brush 106 electrically connected to the inductor 90 is carried by a push button 108 adapted to bring the brush into or out of engagement with the carriers as they pass adjacent it. If desired, a grounding brush, preferably also on a push button or the like, can be added although it is not necessary. Also a brush can be used, if desired, for taking off charge of sign opposite to that on the inductor.

*Operation*

Considering the inductor 90, and of course therefore the brushes 100 and 102, to be fixed, then let the member 92 be translated to the right as seen in the figure, while the push button 108 is depressed. This will charge the inductor 90 by carrying out the method of the invention in a manner similar to that of the rotating forms of the invention. In the particular configuration shown in Fig. 6 the member 92 has already been moved almost to its fullest extent to the right so that the inductor 90 is charged almost to the maximum possible with one cycle. If additional voltage is desired the cycle must be repeated. This can be accomplished by using the push button 108 to withdraw the brush 106 from a position where it can contact the carriers and thereafter moving the member 92 all the way to the left whence it is ready to repeat its charging cycle after the push button has been again depressed. To reduce the charge on plate 90 it is necessary only to leave the push button depressed while moving the member 92 toward the left.

In a preferred form using the scheme of Fig. 6 as illustrated in Fig. 7 the inductor 120 is shown as being carried on the closure plate 122 that coacts with the generally channel-shaped member 124 to form a housing for certain of the parts and a guide for the carrier-bearing member 126. The elements 122, 124, and 126 are preferably made of good insulating material such as the plastic suggested in connection with their counterparts in the embodiments hereinbefore described. A conductor 128 provided with brushes 130 and 132 is cemented or otherwise suitably fixed in a groove 134 in the closure plate 122 with the brushes projecting through suitable openings toward the web of the channel 124 in position to contact carriers 136 mounted on the member 126. The housing of insulation is encased in a conductive casing, preferably of metal, constituted by the channel-shaped member 138 and the plate 140. This provides shielding for the sensitive elements of the device. A lead 142 serves as a takeoff for potential from the inductor 120 and can be designed so as to fit together with any particular body that it is desired to charge. A spring-pressed push button 144 carries brush 146 connected by a flexible conductor 148 to the inductor 120. A shoulder 150 on the push button is adapted to engage the upper surface of the plate 140 to limit depression of the push button so as to prevent any damage to the brush 146. For convenience in assembly the main body of the push button that projects through holes in the plates 122 and 140 is made separate from the top of the button. The device can be assembled by first providing the plate 122 with the inductor 120, the conductor 128 and the main body of the push button. The metal plate 140 is then placed against the insulating plate 122 taking care that the holes are aligned so that the lead 142 and the push button body project through. The spring is then placed around the push button and the top of the push button attached to the body after which this subassembly is ready for attachment to the remainder of the device. The member 126 is placed in position in its guide channel, this being facilitated by making one of the stop members 152 removable, and then the plate 122 is cemented along its surface of contact 154 to the channel 124. Similarly the metal plate 140 is soldered or otherwise conductively attached to the metal channel 138. Conveniently the insulating housing can be made to have a force fit within the metal casing or can be cemented thereto. The operation of this embodiment is similar to that of the schematic embodiment in Fig. 6.

Various parts and arrangements can be used in place of those shown in the specific embodiments. For example, where voltages high enough to produce gaseous conduction are desired, combs of the type familiar in prior art electrostatic machines can be used in place of the frictional contacts or brushes illustrated. While only single generating units embodying the invention have been described in detail, several of these units can be hooked up in multiple if desired, providing that each unit is made in accordance with the principles of the invention.

Obviously many other modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

What is claimed is:

1. A device of the character described comprising an inductor, a rotor including a plurality of carriers and adapted to move said carriers sequentially into and out of the region influenced by said inductor, a brush for electrically connecting said inductor with a carrier, a second brush for contacting said carrier when said carrier is out of contact with said first brush but while said carrier is in the region of the influence of said inductor, a third brush for contacting carriers as they pass through a region remote from the influence of said inductor, means electrically connecting said second brush with said third brush, a fourth brush for grounding said carriers as they pass through a region remote from the influence of said inductor on their path between the points of contact with said second and third brushes.

2. The method of generating electricity which comprises (1) bringing into the proximity of an inductor a portion of a conductor while another portion of that conductor is relatively remote from the inductor and effectively from the influence of any other inductor, (2) while said conductor is so placed, severing the conductor so that said two portions are electrically disconnected from each other, (3) thereafter grounding said first portion while it is remote from the influence of said inductor, (4) also thereafter electrically connecting said second portion of said conductor to said inductor to cause a sharing of charge therebetween, (5) disconnecting said second portion from said inductor, and (6) repeating said process cyclically.

3. The method of claim 2 wherein the inductor and the conductor are made of materials having different electronic work functions.

4. A device of the character described comprising an inductor, a rotor provided with a plurality of spaced carriers, a first brush electrically connected with said inductor and mounted for frictional contact with said carriers, a second brush mounted for frictional contact with said carriers while they are in the region of influence of said inductor, a third brush mounted for frictional contact with a carrier remote from the region of influence of said inductor and effectively from the influence of any other inductor at the instant when said second brush is contacting a carrier, means electrically connecting said second and third brushes, a grounding fourth brush mounted for frictional contact with carriers as they pass a position out of the region of influence of said inductor between the point of contact with said second brush and the point of contact with said third brush.

5. A device of the character described comprising an inductor, a rotor provided with a plurality of carriers mounted so that relative rotation between said inductor and rotor brings the carriers sequentially into and out of the region of influence of said inductor, a brush mounted to contact a carrier while said carrier is in the region of influence of said inductor, a second brush mounted to contact another carrier in a position remote from the influence of said inductor and effectively from the influence of any other inductor simultaneously with the contacting of said first carrier by said first brush, means electrically connecting together said first and second brushes, a grounding third brush mounted to contact carriers as they pass through a position remote from the influence of said inductor and lying on one path of travel between said first and second brushes, a fourth brush mounted to contact carriers as they pass through a position on the other path of travel between said first and second brushes, and means electrically connecting together said fourth brush and said inductor.

6. The device of claim 5 wherein said inductor and at least one of said carriers are made of materials having different work functions.

7. A device of the character described comprising an inductor; a conductor having one portion thereof in the region of influence of said inductor and another portion thereof remote from said region and effectively remote from the influence of any other inductor; means for severing said portions from electrically conducting connection with each other while they are so located; means operable subsequent to the operation of said severing means for placing one of said portions in electrical conducting relation with said inductor and means also operable subsequent to the operation of said severing means adapted for grounding the other of said portions while it is remote from the influence of said inductor.

8. A device of the character described comprising a single inductor only; a conductor having one portion thereof in the region of influence of said inductor and another portion thereof remote from said region; means for severing said portions from electrically conducting connection with each other while they are so located; means operable subsequent to the operation of said severing means for placing one of said portions in electrical conducting relation with said inductor and means also operable subsequent to the operation of said severing means for connecting other said portion in electrical conducting relation to a charge collector of large capacity relative to the capacity of said other portion.

9. A device of the character described comprising an inductor member, a second member having a plurality of spaced carriers, means mounting said members for relative motion to transport said carriers sequentially from a position remote from the influence of said inductor and effectively from the influence of any other inductor through a second position in the region of influence of said inductor to a position remote from the influence of said inductor, first, second, and third contact elements arranged sequentially to contact a carrier as it moves through said positions, said first and third contact elements being electrically connected together and arranged so that one thereof contacts a carrier in the region of influence of said inductor at the same instant that the other thereof contacts a carrier out of the region of influence of said inductor, said second contact element being electrically connected to said inductor.

10. A device of the character described comprising a single inductor only, a conductor having a first portion in the region of influence of said inductor and a second portion remote from said region, means for sequentially severing said two portions from electrical connection with each other and thereafter electrically connecting one of said portions to said inductor.

11. A device of the character described comprising a single inductor only, a conductor adapted for positioning so that a first portion thereof is in the region of influence of said inductor and a second portion thereof is remote from said region, means for severing said portions from electrical conducting relation with each other while said conductor is so positioned, means adapted thereafter to connect one of said portions to said inductor and electrical contact means adapted for also thereafter contacting the other of said portions.

12. A device of the character described comprising a single inductor, means for sequentially positioning each of a plurality of conductors with one portion thereof in the region of influence of said inductor while the other portion thereof is remote from said region, means for severing said portions from electrical conducting relation with each other while said conductor is so positioned, means operable subsequent to the operation of said severing means for placing one of said portions in electrical conducting relation with said inductor and electrical contact means also operable subsequent to the operation of said severing means for contacting said other portion.

13. The device of claim 12 wherein said contacting means is adapted to be connected to ground.

14. The device of claim 13 including a conductive casing for substantially completely shielding the sensitive parts of said device.

15. A device of the character described comprising a single inductor only, a rotor provided with a plurality of spaced carriers arranged to sequentially bring each of said carriers into and out of the region of influence of said inductor, means for electrically connecting a carrier in a first position in the region of influence of said inductor with a carrier in a second position out of said region, said carriers being so spaced and said means being so arranged that whenever a carrier is at said first position another carrier is at said second position, electrical contact means operable to engage said carriers as they move from said first position to said second position while they are out of said region and means operable thereafter as they continue from said second position back towards said first position for connecting said carriers electrically to said inductor.

16. The device of claim 15 including means for shielding the sensitive elements of said device.

17. The device of claim 15 wherein said inductor is made of a material having a different work function from that of the material of said carriers.

18. The device of claim 15 wherein electrical contact means adapted to be grounded are located to contact said carriers passing in the first portion of the cycle from said first position to said second position.

19. A device of the character described comprising an inductor; a member provided with a plurality of carriers adapted to move said carriers sequentially along a first path and along a second different path, both paths extending between the region of influence of said inductor and the region remote from the influence of said inductor and effectively from the influence of any other inductor; means for placing in electrical conducting relation each carrier as it passes through a first position lying in said influence region and on said first path with a carrier in a second position lying on said first path and in said remote region; means for placing said inductor in electrical conducting relation with carriers as they pass through a position lying on said first path intermediate said first and second positions.

20. The device of claim 19 including means adapted to ground said carriers as they pass through a position lying in said remote region and on said second path.

21. The device of claim 19 including means for shielding the sensitive elements of said device.

22. The device of claim 19 wherein said inductor and said carriers are made of materials having different work functions.

23. An electrostatic generator comprising inductor means and carrier-bearing means; a plurality of carriers on said carrier-bearing means; means for sequentially electrically connecting said carriers with said inductor means upon relative motion between said carrier-bearing means and said inductor means; and means including the configuration of said inductor means and including materials of dissimilar work functions embodied respectively in said inductor means and in at least one of said carriers for establishing, upon initiation of a cycle of relative motion between said carrier-bearing means and said inductor means from an initial condition in which said inductor means and said carriers are all uncharged, a state of charge of predetermined sign on said inductor means.

24. An electrostatic generator comprising inductor means and rotor means; a plurality of carriers on said rotors means; brush means for cyclically electrically connecting said carriers with said inductor means upon relative motion between said rotor means and said inductor means; and means including the configuration of said inductor means relative to said rotor means and including materials of dissimilar work functions embodied respectively in said inductor means and in at least one of said carriers for establishing, upon initiation of a cycle of relative rotation between said rotor means and said inductor means from an initial condition in which said inductor means and said carriers are all uncharged, a state of charge of predetermined sign on said inductor means.

25. An electrostatic generator comprising inductor means and rotor means; a plurality of carriers on said rotor means; brush means for cyclically electrically connecting said carriers with said inductor means upon relative motion between said rotor means and said inductor means; means including the configuration of said inductor means relative to said rotor means and including materials of different work functions embodied respectively in said inductor means and in at least one of said carriers for producing, upon initiation of a cycle of relative rotation between said rotor means and said inductor means from an initial condition in which said inductor means and said carriers are all uncharged, a state of charge on said inductor means resulting predominantly from contact potential existing between a carrier and said inductor means, such that the electrostatic forces on an uncharged body located at the center of said rotor due only to the field of said inductor means are unbalanced.

26. An apparatus for generating electricity comprising rotor means including a plurality of carriers and inductor means adjacent the rotor means; means for cyclically electrically connecting carriers of said rotor means with said inductor means; said inductor means and said carriers being so relatively configured and constructed of materials having such relative work functions that during the initial portion of a cycle, starting from a condition wherein said carriers and said inductor means are all uncharged and at the same potential, carriers and said inductor means are electrically connected and acquire, predominantly in response to contact potential, differences of potential and subsequently are electrically disconnected and retain net charges of predetermined sign, the charge distribution on said inductor means being such as to place diametrically opposite carriers on said rotor in regions of essentially different field.

27. An electrostatic voltage generator comprising a plurality of carriers, means including an inductor for producing an electrostatic field in a manner such that said carriers are positioned individually in regions of substantially differing field strengths, means for effecting motion of said carriers relative to said field-producing means whereby individual carriers are brought sequentially into and out of a region of relatively high field strength, means operable during said relative motion for momentarily connecting together electrically a first and second one of said carriers disposed respectively in regions of relatively high and low field strength, a member of large electrical capacity relative to said carriers, means for establishing contact between said first carrier and said member upon continuation of said relative motion subsequent to the operation of said connecting means, and means for establishing contact between said second carrier and said inductor upon continuation of said relative motion subsequent to the operation of said connecting means.

28. An electrostatic voltage generator comprising a plurality of carriers, means including an inductor for producing an electrostatic field in a manner such that said carriers are positioned individually in regions of substantially differing field strengths, means for effecting motion of said carriers relative to said field-producing means whereby individual carriers are brought sequentially into and out of a region of relatively high field strength, means operable during said relative motion for momentarily connecting together electrically a first and second one of said carriers disposed respectively in regions of relatively high and low field strength, a member of large electrical capacity relative to said carriers, means for establishing contact between said first carrier and said member upon continuation of said relative motion subsequent to the operation of said connecting means, and means for establishing contact between said second carrier and said inductor upon continuation of said relative motion subsequent to the operation of said connecting means, said inductor and said carriers being made of materials having different electronic work functions.

References Cited in the file of this patent

UNITED STATES PATENTS

| | | |
|---|---|---|
| 883,846 | Wommelsdorf | Apr. 7, 1908 |
| 2,530,193 | Felici | Nov. 14, 1950 |
| 2,542,494 | Felici | Feb. 20, 1951 |
| 2,577,446 | Bosch | Dec. 5, 1951 |

FOREIGN PATENTS

| | | |
|---|---|---|
| 6,917 | France | Feb. 8, 1907 |
| | (Addition) | |